US009173247B2

(12) United States Patent
Behin

(10) Patent No.: US 9,173,247 B2
(45) Date of Patent: *Oct. 27, 2015

(54) MOBILE WIRELESS COMMUNICATIONS DEVICE INCLUDING PARALLEL NFC LOOP ANTENNAS AND ASSOCIATED METHODS

(71) Applicant: BLACKBERRY LIMITED, Waterloo (CA)

(72) Inventor: Rayhan Behin, Ottawa (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,323

(22) Filed: May 30, 2014

(65) Prior Publication Data

US 2014/0273841 A1 Sep. 18, 2014

Related U.S. Application Data

(63) Continuation of application No. 13/359,804, filed on Jan. 27, 2012, now Pat. No. 8,798,536.

(51) Int. Cl.
| | |
|---|---|
| *H04B 5/00* | (2006.01) |
| *H04W 88/06* | (2009.01) |
| *H04B 5/02* | (2006.01) |
| *H01Q 7/00* | (2006.01) |
| *H04W 4/00* | (2009.01) |

(52) U.S. Cl.
CPC ................. *H04W 88/06* (2013.01); *H01Q 7/00* (2013.01); *H04B 5/0087* (2013.01); *H04B 5/02* (2013.01); *H04W 4/008* (2013.01); *Y10T 29/49018* (2015.01)

(58) Field of Classification Search
CPC ........... H04B 5/02; H04B 5/0087; H01Q 7/00
USPC .................................. 455/41.1, 41.2; 343/855
See application file for complete search history.

(56) References Cited

U.S. PATENT DOCUMENTS

| | | |
|---|---|---|
| 5,198,826 A | 3/1993 | Ito |
| 7,350,706 B2 | 4/2008 | Morita |
| 7,541,930 B2 | 6/2009 | Saarisalo et al. |
| 7,652,578 B2 | 1/2010 | Braun et al. |
| 7,907,057 B2 | 3/2011 | Schaffler et al. |
| 2005/0001779 A1 | 1/2005 | Copeland et al. |
| 2007/0182658 A1 | 8/2007 | Ozden |
| 2008/0210378 A1 | 9/2008 | Lee |
| 2009/0153303 A1 | 6/2009 | Forster |
| 2009/0179812 A1 | 7/2009 | Nakamura et al. |
| 2010/0109970 A1 | 5/2010 | Ganwani et al. |
| 2012/0258660 A1 | 10/2012 | Rajendran et al. |

FOREIGN PATENT DOCUMENTS

| | | |
|---|---|---|
| WO | 2010143849 | 12/2010 |
| WO | 2011076582 | 6/2011 |

*Primary Examiner* — Creighton Smith
(74) *Attorney, Agent, or Firm* — Guntin & Gust, PLC; Andrew Gust

(57) ABSTRACT

A mobile wireless communications device includes a portable housing, an NFC transceiver carried by the portable housing, and an antenna assembly coupled to the NFC transceiver and comprising a plurality of loop antennas connected in parallel, and progressively increasing in size from an innermost loop antenna to an outermost loop antenna.

19 Claims, 3 Drawing Sheets

MOBILE WIRELESS COMMUNICATIONS DEVICE INCLUDING PARALLEL NFC LOOP ANTENNAS AND ASSOCIATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

In accordance with one exemplary aspect, a mobile wireless communications device comprises a portable housing, an NFC transceiver carried by the portable housing, and an antenna assembly carried by the portable housing and coupled to the NFC transceiver. The antenna assembly may comprise a plurality of nested loop antennas coupled in parallel, and progressively increasing in size from an innermost loop antenna to an outermost loop antenna.

As will be explained in greater detail below, the antenna assembly maintains payment certification requirements (as defined by EMVCo) for large tags, while also increasing performance for small tags. Small tags may be used for Bluetooth pairing and interfacing with docking stations, for example. The plurality of nested loop antennas may be non-concentric. This further helps to increase magnetic flux coverage for the small tags.

The plurality of nested loop antennas may comprise three loop antennas. Each loop antenna may have a rectangular shape with opposing ends and opposing sides coupled thereto.

The mobile wireless communications device may further comprise a pair of antenna feed points, and wherein the plurality of nested loop antennas each have respective ends adjacent one another, and adjacent the pair of antenna feed points and coupled thereto. The antenna assembly may further comprise a dielectric substrate, and wherein each loop antenna may comprise at least one loop conductor carried by the dielectric substrate.

The portable housing may comprise a removable battery cover, and wherein the antenna assembly may be carried by the removable battery cover. The innermost loop antenna may be about 15 mm by 15 mm, and the outermost loop antenna may be about 85 mm by 54 mm.

The mobile wireless communications device may further comprise a cellular transceiver carried by the portable housing, and a cellular antenna coupled to the cellular transceiver.

A method aspect is directed to making a mobile wireless communications as described above. The method may comprise positioning an NFC transceiver within a portable housing, and coupling an antenna assembly to the NFC transceiver within the portable housing. The antenna assembly may comprise a plurality of nested loop antennas connected in parallel, and progressively increasing in size from an innermost loop antenna to an outermost loop antenna.

Figure 1:
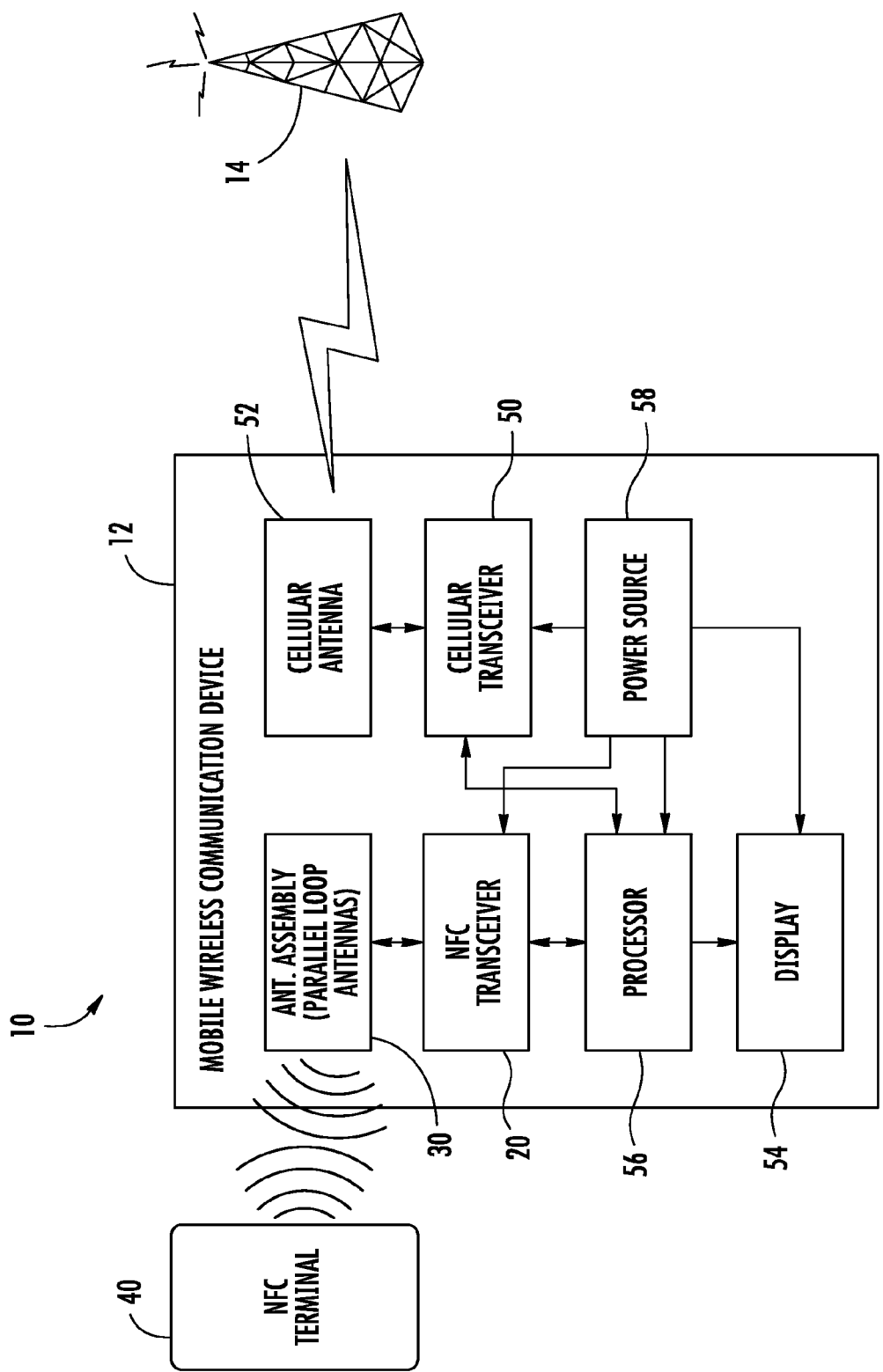
FIG. 1 is a schematic block diagram of a wireless mobile communications system in accordance with an example embodiment.

Referring initially to FIG. 1, the mobile wireless communications device 10 includes a portable housing 12 and an NFC transceiver 20 carried by the portable housing, and an antenna assembly 30 coupled to the NFC transceiver. The antenna assembly 30 includes a plurality of loop antennas connected in parallel, as will be discussed in greater detail below. The NFC transceiver 20 may communicate with an NFC terminal 40, and may operate in either a device reader mode and a device card emulation mode.

The mobile wireless communications device 10 also includes wireless transceiver circuitry 50 carried by the portable housing 12, and an antenna 52 coupled to the wireless transceiver circuitry 50. The wireless transceiver circuitry 50 may be cellular transceiver circuitry or other types of wireless communications circuitry, and may communicate any combination of voice and data, such as email, via a wireless network 14.

Example mobile wireless communications devices 10 include portable or personal media players, such as music or MP3 players, and video players. Mobile wireless communications devices 10 may also include portable gaming devices, portable or mobile telephones, smartphones, tablet computers, and digital cameras, for example.

The mobile wireless communications device 10 includes a display 54 carried by a front exterior surface of the portable housing 12. The display 54 may be a liquid crystal display (LCD) and may be configured to display information relating to a data or voice communications.

A processor 56 is carried the portable housing 12 and is coupled to the wireless transceiver circuitry 50, the NFC transceiver 20 and the display 54. The processor 56 may be implemented using hardware and software components for causing the mobile wireless communications device 10 to perform the various functions or operations described herein.

The mobile wireless communications device 10 also includes a power source 58. For example, the power source 58 may be a rechargeable battery. Nonetheless, other types of power sources may be used.

The mobile wireless communications device 10 is particularly advantageous with respect to NFC communications, as will now be discussed in greater detail. The antenna assembly 30 maintains payment certification requirements (as defined by EMVCo) for large tags, while also increasing performance for small tags.

By way of background, NFC is a short-range wireless communications technology in which NFC-enabled devices are "swiped," "bumped" or otherwise moved in close proximity to communicate. NFC enables exchange of data between two or more wireless devices, generally by inductive coupling. Inductive coupling may be used for completing payment card transactions, for interfacing with smart posters, for Bluetooth pairing and interfacing with docking stations, for example. Payment cards include credit cards, gift cards and bank cards, for example.

Inductive coupling refers to the generation of voltage/current in one loop or coil due to (and proportional to) a change in voltage/current (and hence the corresponding magnetic field) in another loop or coil. The two loops are termed as being "inductively coupled" to each other, and which may thus be viewed as antennas. Currently, NFC communications is standardized and designed to operate within the globally available and unlicensed radio frequency ISM band of 13.56 MHz.

Figure 2:
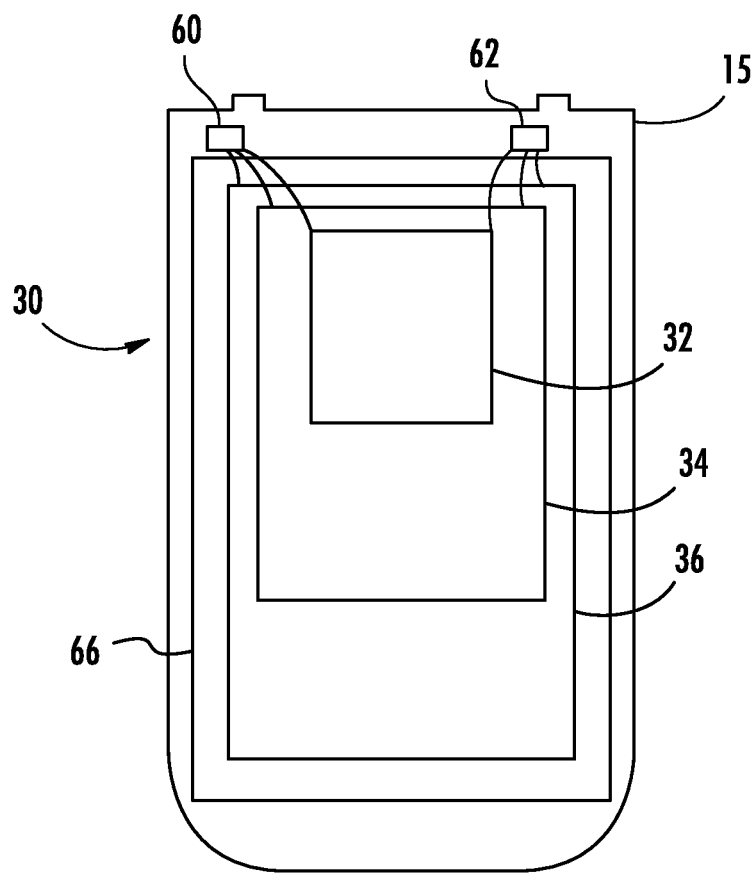
FIG. 2 is a schematic diagram of the antenna assembly illustrated in FIG. 1.

The antenna assembly 30 includes a plurality of nested loop antennas 32, 34, 36 connected in parallel, as best illustrated in FIG. 2. Although three loop antennas 32, 34, 36 are connected in parallel, the actual number may be more or less depending on the intended applications or the amount of space available within the mobile wireless communications device 10.

The selected number of loop antennas to be connected in parallel still needs to support a quality (Q) factor of less than 35, as readily appreciated by those skilled in the art. The Q factor is determined by dividing the inductive reactance (ohms) by the resistive losses in the loops (ohms) at the operating frequency.

The loop antennas 32, 34, 36 that are connected in parallel progressively increase in size from an innermost loop antenna 32 to an outermost loop antenna 36. The loop antennas 32, 34, 36 are connected to feed points 60, 62 that are coupled to the NFC transceiver 20. The loop antennas 32, 34, 36 each have respective ends adjacent one another, and adjacent the pair of antenna feed points 60, 62.

In addition, the loop antennas 32, 34, 36 are non-concentric, and have a rectangular shape with opposing ends and opposing sides coupled thereto. The antenna assembly 30 may include a dielectric substrate 66, with each loop antenna 32, 34, 36 comprising at least one loop conductor carried by the dielectric substrate.

As discussed above, the mobile wireless communications device 10 includes a power source 58 that may be configured as a rechargeable battery carried by a back exterior surface of the portable housing 12. The rechargeable battery 58 is removable from the portable housing 12. For this particular configuration of a mobile wireless communications device 10, the portable housing comprises a removable battery cover 15, and wherein the antenna assembly 30 is carried by the removable battery cover, as illustrated in FIG. 2.

Performance of the antenna assembly 30 will now be discussed in reference to TABLE 1, Antenna performance will be compared against a single antenna. Performance of the single antenna and the antenna assembly 30 are directed towards 4 different tag sizes that conform to industry standards.

The smallest tag size is 15×15 mm, the middle tag sizes are circular shaped and have a diameter of 30

TABLE 1

| | Single Loop Antenna (Max 'Z' Distance) | Triple Loop Antenna (Max 'Z' Distance |
|---|---|---|
| DEVICE READER MODE PERFORMANCE | | |
| Tag Size | | |
| 15 × 15 mm | 15 mm | 21 mm |
| 30 mm dia. | 24.5 mm | 28.5 mm |
| 38 mm dia. | 27 mm | 30 mm |
| 85 × 54 mm | 35 mm | 36 mm |
| DEVICE CARD EMULATION MODE PERFOMANCE | | |
| Modulation Type | | |
| A | 53.5 mm | 55 mm |
| B | 51 mm | 52.5 mm | mm and 38 mm, respectively. The largest tag size is 85×54 mm.

The smallest tag size may be used for Bluetooth pairing and interfacing with docking stations, for example. The circular shaped tags may be used to receive web site information, for example, from smart posters.

The largest tag size meets EMVCo contactless specifications for payment systems. EMVCo, owned by American Express, JCB, MasterCard and Visa, ensures global interoperability of chip-based payment cards with acceptance devices, including point of sale terminals and ATMs.

Operation of the NFC transceiver 20 in a device reader mode will be discussed first. The max "z" distance for each antenna configuration corresponds to a height or separation distance from the NFC terminal 40. For the smallest tag size, the single antenna has a separation distance of 15 mm, and the antenna assembly 30 has a separation distance of 21 mm. For the circular shaped tag having the 30 mm diameter, the single antenna has a separation distance of 24.5 mm, and the antenna assembly 30 has a separation distance of 28.5 mm. For the circular shaped tag having the 38 mm diameter, the single antenna has a separation distance of 27 mm, and the antenna assembly 30 has a separation distance of 30 mm. For the largest tag size, the single antenna has a separation distance of 35 mm, and the antenna assembly 30 has a separation distance of 36 mm.

The increased separation distances provided by the antenna assembly 30 flattens out as antenna sizes increase. However, the antenna assembly 30 advantageously increases small tag reading distances. The loop antennas 32, 34, 36 in the antenna assembly 30 are coupled to antenna feed points 60 and 62, which provide a voltage generated by the NFC transceiver 20. The voltage provided by the feed points 60, 62 generate current that travels around each loop antenna 32, 34, 36 to generate magnetic fields. The magnetic fields are at a constant level and are evenly distributed in the loop areas, i.e., x and y.

The loop antennas 32, 34, 36 pick up magnetic fields within their loop areas. Since the small loop antenna 32 is about $\frac{1}{5}$ the size of the large loop antenna 36, it only picks up about $\frac{1}{5}$ of the magnetic field as compared to that of the larger loop antenna 36. Similar analysis applies to the middle loop antenna 34.

Since the loop antennas 32, 34, 36 are nested and non-concentric, and the smaller size loop antennas 32, 34 are positioned within the larger size loop antenna 36 toward the top of the mobile wireless communications device 10, the field patterns are directed toward the top. The inductive coupling from the larger loop antenna 36 helps to increase the inductive coupling of the middle loop antenna 34, and the inductive coupling from the middle and larger loop antennas 36, 34 help to increase the inductive coupling of the small loop antenna 32.

Operation of the NFC transceiver 20 in a device card emulation mode will be now discussed. The max "z" distance for each antenna configuration corresponds to a height or separation distance from the NFC terminal 40. Based on ISO standards, there is a modulation type A and a modulation type B. For the single antenna, the separation distances correspond to 53.5 mm and 51 mm, respectively. For the antenna assembly 30, the separation distances correspond to 55 mm and 52.5 mm, respectively. There is a slight increase in performance with the antenna assembly 30.

As noted above, antenna assembly 30 needs to support a quality (Q) factor of less than 35, Another definition of the Q factor corresponds to bandwidth. The wider the bandwidth the lower the Q factor. With a single antenna configuration, resistances are typically added to drop the Q factor to meet the data rate requirement. In lieu of adding resistances, additional loop antennas can be connected in parallel to maintain the same Q factor. In other words, the headroom associated with the single antenna can be applied to parallel antennas while increasing NFC performance for smaller size tags.

Figure 3:
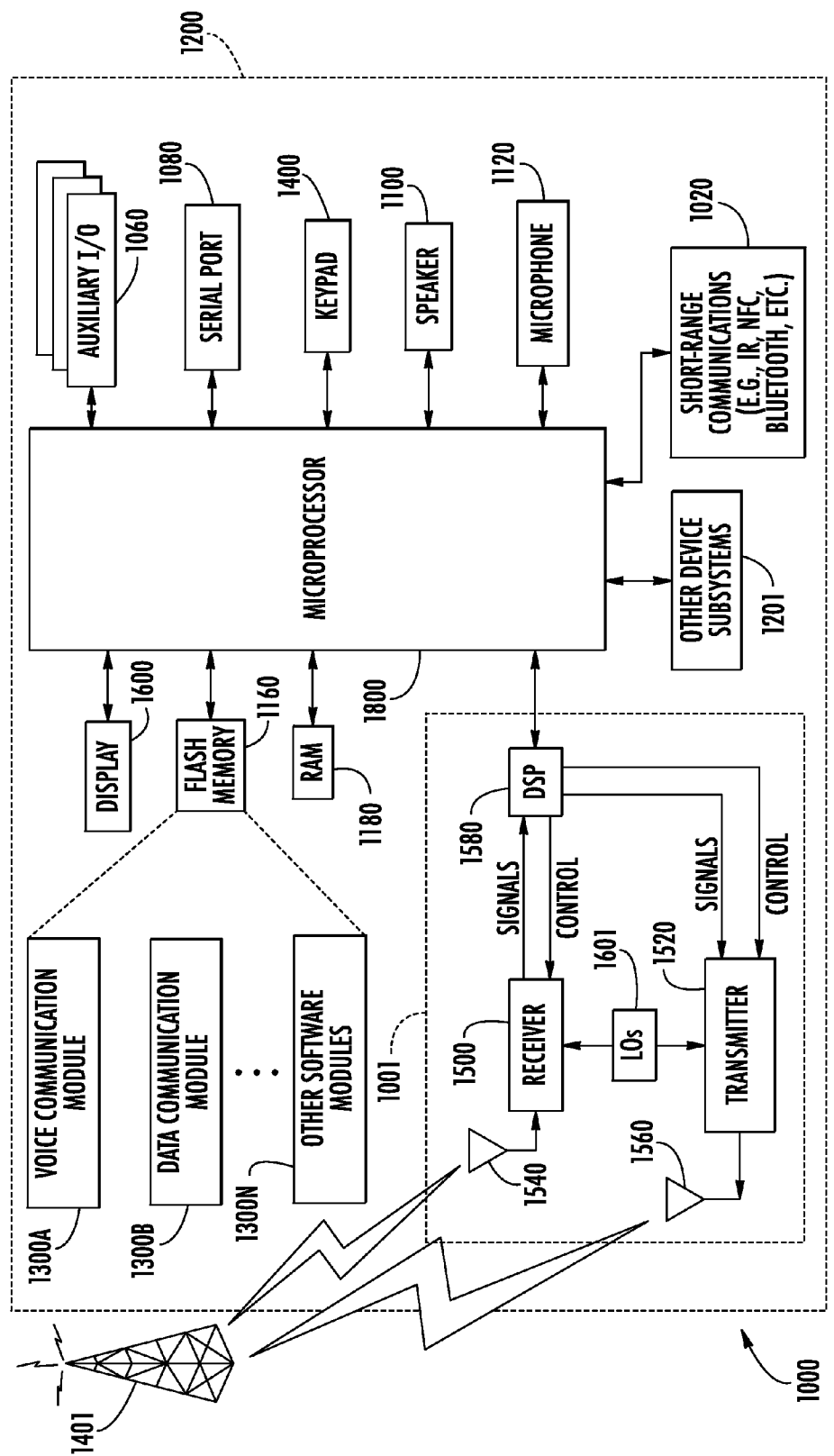
FIG. 3 is a schematic block diagram illustrating example mobile wireless communications device components that may be used with the system and devices of FIGS. 1 and 2.

Example components of a mobile wireless communications device 1000 that may be used in accordance with the above-described embodiments are further described below with reference to FIG. 3. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with an NFC device or NFC tag vian NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. An electronic device comprising:
   an NFC transceiver;
   a pair of antenna feed points coupled to said NFC transceiver; and
   a plurality of nested loop antennas having adjacent ends electrically coupled in parallel and to said pair of antenna feed points, said plurality of nested loop antennas progressively increasing in size from an innermost loop antenna to an outermost loop antenna.

2. The electronic device of claim 1, wherein said plurality of nested loop antennas is non-concentric.

3. The electronic device of claim 1, wherein said plurality of nested loop antennas comprises three loop antennas.

4. The electronic device of claim 1, wherein each loop antenna has a rectangular shape with opposing ends and opposing sides coupled thereto.

5. The electronic device of claim 1, further comprising a dielectric substrate mounting said plurality of nested loop antennas.

6. The electronic device of claim 1, further comprising a removable battery cover mounting said plurality of nested loop antennas.

7. The electronic device of claim 1, wherein said innermost loop antenna is about 15 mm by 15 mm, and wherein said outermost loop antenna is about 85 mm by 54 mm.

8. An electronic device comprising:
   a housing
   a cellular transceiver carried by said housing;
   a cellular antenna carried by said housing an dcoupled to said cellular transceiver;
   an NFC transceiver carried by said housing;
   a pair of antenna feed points coupled to said NFC transceiver; and
   a plurality of nested loop antennas having adjacent ends electrically coupled in parallel and to said pair of antenna feed points.

9. The electronic device of claim 8, wherein said plurality of nested loop antennas progressively increase in size from an innermost loop antenna to an outermost loop antenna.

10. The electronic device of claim 8, wherein said plurality of nested loop antennas is non-concentric.

11. The electronic device of claim 8, wherein said plurality of nested loop antennas comprises three loop antennas.

12. The electronic device of claim 8, wherein each loop antenna has a rectangular shape with opposing ends and opposing sides coupled thereto.

13. The electronic device of claim 8, further comprising a dielectric substrate mounting said plurality of nested loop antennas.

14. A method for making an electronic device comprising:
    coupling a pair of antenna feed points to an NFC transceiver; and
    coupling adjacent ends of a plurality of nested loop antennas in parallel and to the pair of antenna feed points, the plurality of nested loop antennas progressively increasing in size from an innermost loop antenna to an outermost loop antenna.

15. The method of claim 14, wherein the plurality of nested loop antennas is non-concentric.

16. The method of claim 14, wherein the plurality of nested loop antennas comprises three loop antennas.

17. The method of claim 14, wherein each loop antenna has a rectangular shape with opposing ends and opposing sides coupled thereto.

18. The method of claim 14, further comprising mounting the plurality of nested loop antennas on a dielectric substrate.

19. The method of claim 14, wherein the innermost loop antenna is about 15 mm by 15 mm, and wherein the outermost loop antenna is about 85 mm by 54 mm.

* * * * *

UNITED STATES PATENT AND TRADEMARK OFFICE
CERTIFICATE OF CORRECTION

| | | |
|---|---|---|
| PATENT NO. | : 9,173,247 B2 | Page 1 of 1 |
| APPLICATION NO. | : 14/291323 | |
| DATED | : October 27, 2015 | |
| INVENTOR(S) | : Rayhan Behin | |

It is certified that error appears in the above-identified patent and that said Letters Patent is hereby corrected as shown below:

In the claims

In Column 8, claim 8, Line 16, please replace "an dcoupled" with "and coupled"

Signed and Sealed this
Twenty-third Day of February, 2016

Michelle K. Lee
*Director of the United States Patent and Trademark Office*